United States Patent Office 2,786,861
Patented Mar. 26, 1957

2,786,861

PREPARATION OF ORGANOCHLOROSILANES

Harry R. McEntee, Waterford, N. Y., assignor to General Electric Company, a corporation of New York No Drawing. Application April 26, 1955,
Serial No. 504,097

9 Claims. (Cl. 260—448.2)

This invention is concerned with a process for the preparation of alkylchlorosilanes whereby chlorine atoms of one silane are interchanged with alkyl groups of another silane. More particularly, this invention relates to a process which comprises effecting reaction under anhydrous conditions in the presence of aluminum trichloride and in the additional presence of catalytic amounts of a compound containing an Si—H grouping at a temperature ranging from about 50° to about 225° C. between (1) a preformed compound corresponding to the general formula $(R)_mSi(Cl)_{4-m}$ and (2) a preformed compound corresponding to the general formula $$(R')_nSi(Cl)_{4-n}$$

where R is an alkyl radical, R' is a member selected from the class consisting of aryl and alkyl radicals, $m$ is a whole number equal to from 1 to 4, inclusive, and $n$ corresponds to a whole number equal to from 0 to 3, inclusive, $m$ and $n$ being at all times dissimilar. For brevity, the formulas in (1) and (2) above will be hereinafter referred to as "chlorosilanes."

In Sauer Patent 2,647,136 issued July 28, 1953, and in Barry et al. Patent 2,647,912 issued August 4, 1953, there are disclosed reactions between different chlorosilanes in which one chlorosilane has a different number of alkyl groups and chlorine atoms attached to the silicon atom than does the silicon atom of the other coreacting chlorosilane. Thus, in U. S. Patent 2,647,912, it is stated that trimethylchlorosilane can be reacted with either methyltrichlorosilane or silicon tetrachloride or with trichlorosilane (HSiCl₃), to give good yields of dimethyldichlorosilane. In accordance with the latter patent, the dimethyldichlorosilane product is obtained by carrying out the aforesaid reaction between the alkyl chlorosilane and the other chlorosilane at temperatures in excess of 300° C. in the presence of a Friedel-Crafts type catalyst, particularly aluminum trichloride. U. S. 2,647,136 is concerned with the same type of reaction employing essentially the same conditions.

In general, both the above Sauer and Barry et al. patents state that temperatures of at least 250° C. and preferably above 300° C. are essential in order to obtain satisfactory yields of the dialkyl dihalogenosilane, for instance, the dimethyldichlorosilane. Barry et al. Patent 2,647,912 points out that at temperatures below 300° C. the rate of redistribution of the alkyl radicals and the chlorine atoms is impracticably low. Sauer also points out similarly that insufficient reaction occurs in temperatures below 250° C. either with or without a catalyst to make temperatures below 250° C. of any practical value.

Unexpectedly, I have discovered that contrary to what might be predicted in advance in view of what was known previously as evidenced by the disclosures and teachings in the above-identified Sauer and Barry et al. patents, I can carry out reactions between organochlorosilanes of the general formula $(R)_mSi(Cl)_{4-m}$ and another preformed organochlorosilane of the general formula $(R')_nSi(Cl)_{4-n}$, where R, R', $m$ and $n$ have the meanings given above, at temperatures well below the 300° C. or 250° C. required in the practice of the inventions described in the prior art, and that I can obtain good yields of diorganodichlorosilanes, particularly dimethyldichlorosilane even at temperatures as low as 50° to 150° C. Moreover, I have found that the time required to obtain the optimum yields under equilibrium conditions is commercially feasible.

In accordance with my invention, I carry out the reaction between the preformed compounds recited above at a temperature ranging from about 50° to 225° C. in the liquid phase employing aluminum trichloride as a catalyst and in addition employing as a necessary catalytic agent a small amount of monomeric silane compound containing an Si—H grouping.

Among the alkyl radicals which R and R' may be are, for instance, methyl, ethyl, propyl, isopropyl, butyl, amyl, octyl, etc. Preferably, R and R' are lower alkyl radicals of from 1 to 4 carbon atoms. Compounds in which R and R' are alkyl radicals coming within the scope of the formulae recited above are, for instance, tetramethylsilane, methyltrichlorosilane, dimethyldichlorosilane, trimethylchlorosilane, triethylchlorosilane, tetraethylsilane, ethyltrichlorosilane, tripropylchlorosilane, diisopropyldichlorosilane, dibutyldichlorosilane, triisobutylchlorosilane, amyltrichlorosilane, etc. Preferably, R and R' are lower alkyl radicals such as those containing from 1 to 4 carbon atoms. In addition to the above, it is apparent that the compound corresponding to the formula $(R')_nSi(Cl)_{4-n}$ may also be silicon tetrachloride. Examples of aryl radicals which R' may be are, for instance, phenyl, tolyl, xylyl, biphenyl, naphthyl, etc.

Examples of mixtures of reactions which may be employed are, for instance, tetramethylsilane and silicon tetrachloride, trimethylchlorosilane and methyltrichlorosilane, trimethylchlorosilane and silicon tetrachloride, trimethylchlorosilane and phenyltrichlorosilane, triethylchlorosilane and ethyltrichlorosilane, etc.

The monomeric monosilicon organic compound containing an Si—H linkage may be any one of those presently known in the art and may contain additional groups or radicals attached to silicon which will not inhibit the reaction between the chlorosilanes and will not undesirably affect the obtaining of the desired reaction product. Among the compounds having the Si—H linkage are, for instance, those corresponding to the general formula $R''_nSiH_{(4-m-n)}Cl_m$, where R'' has the same meanings as R and R', and $m$ and $n$ are integers equal to from 0 to 3, and the sum of $m$ and $n$ is equal to at most 3. Among such compounds may be mentioned, for instance, phenyldichlorosilane, dichlorophenyldichlorosilane, dimethylchlorosilane [(CH₃)₂SiHCl], methyldichlorosilane, trichlorosilane, dichlorosilane (H₂SiCl₂), monochlorosilane, trimethylsilane, silane (SiH₄), ethyldichlorosilane, etc. R'' may also be other monovalent hydrocarbons or halogenated, for instance, chlorinated, monovalent hydrocarbons, e. g., higher alkyl radicals, for instance, octyl, nonyl, etc., radicals; alkaryl radicals, e. g., tolyl, xylyl, ethylphenyl, etc., radicals; aralkyl radicals, e. g., benzyl, phenylethyl, etc., radicals; cycloaliphatic radicals, etc. Examples of halogenated radicals which may be employed are, for instance, chlorophenyl radicals, for instance, dichlorophenyl radicals, fluorophenyl radicals, etc.

The organosilicon composition containing the Si—H grouping (for brevity hereinafter referred to as "hydrosilane") employed in the reaction mixture as the catalytic promoter is preferably varied from about 0.01 to about 10%, by weight, based on the total weight of the reactants, the reactants meaning the mixture of chlorosilanes (e. g., trimethylchlorosilane and methyltrichlorosilane) required to interact to give the redistribution reaction (e. g., dimethyldichlorosilane). Preferably, I employ about 2 to 8% of the hydrosilane based on the total weight of the chlorosilane reactants. Although amounts of the hydrosilane in excess of 10% may be used, no useful purpose is derived. However, as larger amounts are employed, interaction with the reactants will occur.

The temperature at which the reaction is caused to proceed may be varied depending upon such factors as the particular dichlorosilanes employed, concentration of the aluminum trichloride catalyst, the time of reaction, the presence or absence of pressure, the concentration of the hydrosilane, etc. I have found that good results are obtained if temperatures of the order of from about 50° to 225° C. are used, and that sufficient interaction takes place at temperatures of the order of about 125° to 175° C. Below 50° C., insufficient reaction occurs requiring excessively long periods of time to obtain adequate yields, while above 225° C., there is tendency for the reaction mixture to vaporize and the aluminum trichloride to sublime so that liquid phase interaction, which is essential in the practice of the present invention, is difficult to maintain. At temperatures of the order of about 125° to 175° C., in the presence of optimum amounts of catalysts and hydrosilane, the claimed reaction proceeds substantially to completion in from about 8 to 12 hours, although times as long as 20 to 25 hours may be employed to insure attainment of equilibrium conditions.

The amount of aluminum trichloride (or compounds of aluminum trichloride decomposable under the reaction conditions to aluminum trichloride) employed in the reaction may be varied within fairly wide limits. Generally, I have found that good results occur when from about 1 to 15%, by weight, preferably from 2 to 10%, by weight, aluminum trichloride is used based on the total weight of the mixture of reacting chlorosilanes employed.

The reaction is advantageously carried out at superatmospheric pressures, in order to effect more intimate contact between the various molecules, to maintain the bulk of the reaction mass in the liquid phase, and to repress sublimation of the aluminum trichloride. Within the temperature range employed in carrying out the reaction, pressures varying from about 15 p. s. i. to about 500 p. s. i. are generally satisfactory. The use of higher reaction pressures is not precluded. Atmospheric pressures may be used, but care should be taken that the temperature used does not cause undesirable sublimation of the aluminum chloride, and that the reaction mixture is in the liquid phase.

The proportion of the reactants used may be varied widely. The molecular proportions of the reactants should be such that optimum yields of the desired product are obtained. Theoretically, the chlorosilanes may be interacted in any desired relative proportions. Thus, widely divergent ratios of the reactants produce yields of the desired organochlorosilane, for instance, dimethyldichlorosilane, much more favorably than would be expected with the particular ratio of reactants employed. It is preferred, however, to employ the reactants in such proportion that there are present between 0.5 and 3 chlorine atoms per silicon-bonded organic radical in the reaction mixture. Inasmuch as usually the desired product is a diorganodichlorosilane, e. g., dimethyldichlorosilane, it is obvious that the most advantageous ratio of materials in the charge is one which contains one chlorine per silicon-bonded organic radical, e. g., one chlorine atom per methyl radical, assuming that the reaction mixture is composed of, for instance, trimethylchlorosilane with either methyltrichlorosilane or silicon tetrachloride. The actual proportion will depend, for instance, on such factors as the desired product, the starting materials available, etc. It will, of course, be apparent to those skilled in the art that the starting mixture may contain more than two of the halogenosilane components.

In order that those skilled in the art may better understand how the present invention may be practiced, the following examples are given by way of illustration and not by way of limitation. All parts are by weight.

In all the following examples, unless stated otherwise, the pressure equipment employed was a 500 cubic centimeter pressure reactor which was provided with suitable arrangements whereby the reactor, together with its contents, could be uniformly heated at elevated temperatures. All reactions were conducted under substantially anhydrous conditions. The temperature and pressure conditions were such that essentially all the reactants were in the liquid phase where interaction took place.

*Example 1*

400 parts of an equimolar mixture of trimethylchlorosilane and methyltrichlorosilane, 25 parts trichlorosilane as catalyst, and 45 parts aluminum trichloride were charged to the pressure vessel described above and the vessel sealed shut. The charged vessel was heated to 150° C. and kept at this temperature for 20 hours. The pressure during the reaction was 150 p. s. i. throughout the time when the temperature was at 150° C. At the end of this time, the contents were removed and analyzed. It was found that of the 95% recovery of materials in the reaction product, 64% of the reaction product consisted of dimethyldichlorosilane.

*Example 2*

400 parts of an equimolar mixture of trimethylchlorosilane and methyltrichlorosilane, 25 parts methyldichlorosilane as catalyst, and 45 parts aluminum chloride were charged to the reaction vessel described previously and the vessel sealed shut. The charged vessel was heated to 150° C. and kept at this temperature for 23 hours. The pressure during this time was 140 p. s. i. g. throughout the time that the temperature was 150° C. The contents were then removed and analyzed with the result that of the 92% material recovery, 79% analyzed for dimethyldichlorosilane.

*Example 3*

88 parts tetramethylsilane containing about 12%, by weight thereof, of methyldichlorosilane, 109 parts trimethylchlorosilane and 149 parts methyltrichlorosilane were heated in the above-identified pressure reactor with 5%, by weight, of the reaction mixture of aluminum chloride for 20 hours at 200° C., during which time the reaction mixture was in liquid phase, and the pressure was 245 p. s. i. At the end of this time, the reaction mixture was removed and the product analyzed. Of the 95% recovered material, it was found that 74% of the product was dimethyldichlorosilane.

*Example 4*

400 parts of a material in the molar ratio of 1 mol of purified silicon tetramethyl to 2 mols of methyltrichlorosilane, and 45 grams of aluminum chloride, without any hydrosilane, were charged to the pressure vessel employed previously, the vessel sealed and heated at 150° C. for 19 hours. At the end of this time, the reaction mixture was analyzed with the result that although there was essentially 100% recovery of material, only 12% of the product was dimethyldichlorosilane and 31% was trimethylchlorosilane. These results show clearly that in the absence of the organosilicon compound containing a silicon-bonded hydrogen, very little reaction was obtained as compared to the case where an organosilicon compound containing a silicon-bonded hydrogen was present.

*Example 5*

15 parts of an equimolar mixture of trimethylchlorosilane and methyltrichlorosilane containing 5 weight percent phenyldichlorosilane ($C_6H_5SiHCl_2$) and 1½ parts aluminum chloride were sealed in a pressure vessel and the latter heated at 150° C. for 24 hours. The pressure vessel was cooled, the contents removed and analyzed to give essentially quantitative recovery of reaction materials in which 85% of the reaction product analyzed for dimethyldichlorosilane.

Example 6

200 pounds of a mixture of methylchlorosilanes comprising, by weight, about 58% methyltrichlorosilane, 25% tetramethylsilane, and 14% of equal parts of trichlorosilane, methyldichlorosilane and dimethylchlorosilane, the balance comprising small amounts of dimethyldichlorosilane and trimethylchlorosilane, together with 12 pounds anhydrous aluminum trichloride were heated under anhydrous conditions at the reflux temperature of the mass (approximately 58° C.) at atmospheric pressure for about 24 hours, during which time the reaction took place in the liquid phase. Thereafter the reaction mass was analyzed with the following results. Whereas the original mixture of methylchlorosilanes contained about 3 weight percent dimethyldichlorosilane, the reaction product now contained 17.4% dimethyldichlorosilane. Also, the reaction mass was found to contain 35.9% trimethylchlorosilane (as compared to less than 1% trimethylchlorosilanes in the mixture of starting methylchlorosilanes). There was no detectable amount of tetramethylsilane, even though the original mixture of methylchlorosilane contained 25%. This example, in addition to illustrating the ability to use in the present invention mixtures of hydrosilanes as the catalytic agent, also shows that advantageous conversion can be obtained in the practice of the present invention even at temperatures as low as 58° C., which temperatures are materially below those heretofore believed practical or even possible in redistribution reactions.

Example 7

Example 1 was repeated exactly with the exception that the trichlorosilane was replaced with an equal amount of the cohydrolysis product of 95 mol percent methyldichlorosilane, 5 mol percent trimethylchlorosilane as catalyst. The mixture of ingredients was heated in the pressure vessel at 150° C. for about 20 hours at the end of which time analysis showed that no conversion to dimethyldichlorosilane had occurred. This example shows clearly that even though the polysiloxane catalyst material contained an Si—H grouping, it did not catalyze the reaction as did the monomeric hydrosilanes.

Example 8

119 parts trimethylchlorosilane, 231 parts phenyltrichlorosilane, 20 grams trichlorosilane as catalyst, and 40 grams aluminum trichloride were charged to the pressure vessel described above and the vessel sealed shut. The charged vessel was heated to 150° C. and kept at this temperature for 19½ hours. The contents of the pressure reaction vessel were then removed, and 100 parts of the reaction product were distilled in the presence of 25 parts sodium chloride, the sodium chloride serving to complex the free aluminum chloride and thereby prevent dephenylation. As product from this distillation, there were obtained 34 parts dimethyldichlorosilane and 24 parts methylphenyldichlorosilane, representing about a 58% yield of diorganodichlorosilanes.

Example 9

160 parts trimethylchlorosilane, 125 parts silicon tetrachloride, 17 parts trichlorosilane and 33 parts aluminum chloride were charged to the same pressure reactor employed in the foregoing examples, the reaction vessel sealed shut, and the charged vessel heated for twenty-four hours at 150° C. At the end of this time, the contents of the reaction vessel were removed and the reaction product analyzed. This analysis showed that 55 weight percent of the reaction product was dimethyldichlorosilane, the balance being, for the most part, unreacted trimethylchlorosilane and silicon tetrachloride, together with smaller amounts of methyltrichlorosilane and methyldichlorosilane.

It will, of course, be apparent to those skilled in the art that other mixtures of reactants as well as other catalytic organic compounds containing silicon-bonded hydrogen may be employed without departing from the scope of the invention. Also, the proportions of ingredients used may be varied widely.

My claimed process is useful in connection with the azeotropic mixture of silicon tetrachloride and trimethylchlorosilane obtained as a result of the direct reaction of silicon and methyl chloride in accordance with the process described and claimed in Rochow Patent 2,380,995, issued August 7, 1945, and assigned to the same assignee as the present invention. Great difficulty has been experienced in separating the two components of this azeotropic mixture in view of the close boiling points of the components. By means of my invention, it is now possible to utilize this azeotropic mixture by converting it to a composition containing large amounts of the more desirable dimethyldichlorosilane, which can be readily separated by usual distillation procedures and which has greater utility as, for instance, in the preparation of resins, lubricating oils, synthetic rubbers, etc.

The organochlorosilanes produced in accordance with my process can be hydrolyzed either by themselves or with other hydrolyzable organosilanes to produce silicone resins, rubbers or oils. The organopolysiloxane gums obtained can be mixed with various fillers, for instance, silica aerogel and curing agents such as benzoyl peroxide, and thereafter molded under pressure at elevated temperatures of about 150° to 250° C. for varying lengths of time to give solid, elastic products having good resistance to heat at elevated temperatures while still remaining flexible at low temperatures of about −50° C. or lower. Such silicone products can be employed as gaskets in both high temperature and low temperature applications. Oils prepared from the organochlorosilanes produced in accordance with the practice of the present invention can be used as lubricants or they can be employed with various waxes and solvents to make silicone polishes for furniture, cars, etc.

What I claim as new and desire to secure by Letters Patent of the United States is:

1. The process which comprises effecting reaction under substantially anhydrous conditions in the presence of aluminum trichloride and a monomeric silane containing a silicon-bonded hydrogen atom at a temperature ranging from about 50° to 225° C. between (1) a preformed compound corresponding to the general formula $$(R)_m Si(Cl)_{4-m}$$

and (2) a preformed compound corresponding to the general formula $(R')_n Si(Cl)_{4-n}$ where R is an alkyl radical, R' is a hydrocarbon radical selected from the class consisting of alkyl radicals and aryl radicals, $m$ is a whole number equal to from 1 to 4, inclusive, and $n$ is a whole number equal to from 0 to 3, inclusive, $m$ and $n$ being at all times dissimilar, the above monomeric silane comprising from 0.01 to 10%, by weight, based on the total weight of (1) and (2).

2. The process which comprises effecting reaction under substantially anhydrous conditions in the presence of aluminum trichloride and a monomeric silane containing a silicon-bonded hydrogen atom at a temperature ranging from about 50° to 225° C. between (1) trimethylchlorosilane and (2) methyltrichlorosilane, the above monomeric silane comprising from 0.01 to 10%, by weight, based on the total weight of (1) and (2).

3. The process which comprises effecting reaction under substantially anhydrous conditions in the presence of aluminum trichloride and a monomeric silane containing a silicon-bonded hydrogen atom at a temperature ranging from about 50° to 225° C. between (1) trimethylchlorosilane and (2) silicon tetrachloride, the above monomeric silane comprising from 0.01 to 10%, by weight, based on the total weight of (1) and (2).

4. The process which comprises effecting reaction under substantially anhydrous conditions in the presence of aluminum trichloride and a monomeric silane selected from the class consisting of trichlorosilane, methyldichlorosilane and phenyldichlorosilane at a temperature ranging from about 50° to 225° C. between (1) a preformed compound corresponding to the general formula $(R)_mSi(Cl)_{4-n}$ and (2) a preformed compound corresponding to the general formula $(R')_nSi(Cl)_{4-n}$ where R is an alkyl radical, R' is a hydrocarbon radical selected from the class consisting of alkyl radicals and aryl radicals, $m$ is a whole number equal to from 1 to 4, inclusive, and $n$ corresponds to a whole number equal to from 0 to 3, inclusive, $m$ and $n$ being at all times dissimilar, the above monomeric silane comprising from 0.01 to 10%, by weight, based on the total weight of (1) and (2).

5. The process which comprises effecting reaction under substantially anhydrous conditions in the presence of aluminum trichloride and a monomeric silane containing a silicon-bonded hydrogen atom at a temperature ranging from about 125° to 225° C. between (1) tetramethylsilane and (2) methyltrichlorosilane, the above monomeric silane comprising from 0.01 to 10% by weight, based on the total weight of (1) and (2).

6. The process which comprises effecting reaction under substantially anhydrous conditions in the presence of aluminum trichloride and catalytic amounts of trichlorosilane at a temperature of from 125° to 225° C. between (1) trimethylchlorosilane and (2) methyltrichlorosilane, the above trichlorosilane comprising from 0.01 to 10%, by weight, based on the total weight of (1) and (2).

7. The process which comprises effecting reaction under substantially anhydrous conditions in the presence of aluminum trichloride and catalytic amounts of methyldichlorosilane at a temperature of from 125° to 225° C. between (1) trimethylchlorosilane and (2) methyltrichlorosilane, the above methyldichlorosilane comprising from 0.01 to 10%, by weight, based on the total weight of (1) and (2).

8. The process which comprises effecting reaction under substantially anhydrous conditions in the presence of aluminum trichloride and catalytic amounts of trichlorosilane at a temperature of from 125° to 225° C. between (1) trimethylchlorosilane and (2) silicon tetrachloride, the above trichlorosilane comprising from 0.01 to 10%, by weight, based on the total weight of (1) and (2).

9. The process which comprises effecting reaction under substantially anhydrous conditions in the presence of aluminum trichloride and catalytic amounts of trichlorosilane at a temperature of from 125° to 225° C. between (1) phenyltrichlorosilane and (2) trimethylchlorosilane, the above trichlorosilane comprising from 0.01 to 10%, by weight, based on the total weight of (1) and (2).

References Cited in the file of this patent

UNITED STATES PATENTS 2,647,912 Barry _____ Aug. 4, 1953

OTHER REFERENCES

Whitemore et al.: "Jour. Am. Chem. Soc.," vol. 69 (1947), pages 2108–10.